United States Patent
Bartolotta et al.

(10) Patent No.: US 10,900,571 B2
(45) Date of Patent: Jan. 26, 2021

(54) THROTTLE BODY OR ACTUATOR, IN PARTICULAR FOR SUPPLYING HIGH PRESSURE GAS, PROVIDED WITH VENT

(71) Applicant: MAGNETI MARELLI S.p.A., Corbetta (IT)

(72) Inventors: Giancarlo Bartolotta, Corbetta (IT); Stefano Musolesi, Corbetta (IT); Michele Garofalo, Corbetta (IT)

(73) Assignee: MAGNETI MARELLI S.p.A, Corbetta (IT)

( * ) Notice: Subject to any disclaimer, the term of this patent is extended or adjusted under 35 U.S.C. 154(b) by 0 days.

(21) Appl. No.: 16/286,950

(22) Filed: Feb. 27, 2019

(65) Prior Publication Data

US 2019/0264816 A1    Aug. 29, 2019

(30) Foreign Application Priority Data

Feb. 27, 2018    (IT) ..................... 102018000003099

(51) Int. Cl.
*F16K 1/20*     (2006.01)
*F16K 25/02*    (2006.01)
(Continued)

(52) U.S. Cl.
CPC ............ *F16K 1/2078* (2013.01); *F02D 9/106* (2013.01); *F02M 26/54* (2016.02); *F16K 1/2007* (2013.01); *F16K 25/02* (2013.01); *F16K 41/026* (2013.01)

(58) Field of Classification Search
CPC ...... F16K 1/2078; F16K 41/026; F16K 25/02; F16K 1/2007; F02D 9/106; F02M 26/54
See application file for complete search history.

(56) References Cited

U.S. PATENT DOCUMENTS 3,714,968 A * 2/1973 Billeter ................. B60T 17/043
                                                    137/596.2
3,938,541 A   2/1976 Polacheck et al.
(Continued)

FOREIGN PATENT DOCUMENTS

DE    102008016727 A1    10/2009
EP       1247974 A1      10/2002
(Continued)

OTHER PUBLICATIONS

Search Report for Italian Patent Application No. 201800003099 dated Oct. 19, 2018.

*Primary Examiner* — Kevin L Lee
(74) *Attorney, Agent, or Firm* — Howard & Howard Attorneys PLLC

(57) ABSTRACT

A throttle body or actuator for an engine, comprising a main body which defines at least one supply duct having a through lumen for a gas mixture, a choke valve placed inside said supply duct so as to modify said through lumen. The choke valve is provided with an occluding body connected to a control shaft, at least partially housed in a seat in the main body. The control shaft, inside the seat and on the side of the occluding body, is provided with a first gasket adapted to prevent the penetration of dirt and gas from the supply duct. Downstream of the first gasket, on the side of the control shaft, at least one vent is provided, adapted to allow the expulsion, outside the seat, of any gas which has leaked through the first gasket.

15 Claims, 7 Drawing Sheets

(51) Int. Cl.
    *F16K 41/02*     (2006.01)
    *F02D 9/10*     (2006.01)
    *F02M 26/54*     (2016.01)

(56) References Cited

U.S. PATENT DOCUMENTS

| | | | | |
|---|---|---|---|---|
| 4,548,237 | A | * | 10/1985 | Bogenschutz ........ F16K 5/0605 137/625.22 |
| 2011/0147632 | A1 | * | 6/2011 | Brestel ................. F16K 41/026 251/214 |
| 2013/0001882 | A1 | | 1/2013 | Voigtlaender et al. |
| 2013/0240771 | A1 | * | 9/2013 | Nemenoff ............... F16K 35/06 251/315.01 |
| 2014/0312258 | A1 | | 10/2014 | Kato et al. |

FOREIGN PATENT DOCUMENTS

| | | | |
|---|---|---|---|
| EP | 1975387 | A1 | 10/2008 |
| JP | 4249651 | B2 | 4/2009 |
| JP | 2009162085 | A | 7/2009 |
| WO | 2008144686 | A1 | 11/2008 |

\* cited by examiner

THROTTLE BODY OR ACTUATOR, IN PARTICULAR FOR SUPPLYING HIGH PRESSURE GAS, PROVIDED WITH VENT

CROSS-REFERENCE TO RELATED APPLICATIONS

The present application claims priority to and all the benefits of Italian Patent Application No. 102018000003099, filed on Feb. 27, 2018, which is hereby expressly incorporated herein by reference in its entirety.

BACKGROUND OF THE INVENTION

1. Field of the Invention

The present invention relates to a throttle body or actuator, in particular for supplying high pressure gas, provided with vent.

2. Description of the Related Art

As known, the throttle bodies and the actuators in engine applications are used for controlling and choking a flow, typically a mixture of fuel and/or combustion supporting air, typically fed to a motor.

The mixture can be fed either before combustion, as in the case of the typical throttle bodies, or after combustion, as occurs for example in exhaust gas recirculation actuators or valves (known as EGR).

The throttle body or actuator typically comprises at least one supply duct having a lumen partially occluded by a valve or throttle which by turning about a spindle appropriately varies the lumen used for the passage of the mixture to be fed.

The transmission shaft is, in turn, kinematically connected to a motor, typically an electric motor, for its actuation, through the interposition of a mechanism.

The pressurized gas which passes through the duct and at least partially strikes against the throttle must not penetrate through the gap or clearance in which said spindle rotates.

Indeed, the mixture is usually pressurized (sometimes even under pulsating pressure) and, as a result of the expansion due to the leakage, may be subject to a high thermal shock, which may lead to the formation of ice.

Ice is harmful because it can cause the seizure of the shaft or may oppose resistance to its rotation and therefore to the actuation of the throttle.

The phenomenon is particularly felt, e.g. when using mixtures which contain hydrogen, methane, LPG.

In particular, the hydrogen molecule is dangerous because it is very small and reactive and therefore easily tends to leak but is also subject to the risk of fire.

Moreover, leakage is also dangerous because the gas after leaking and expanding may be fired by overheating and possible sparks from the electrical motor which controls the rotation of the shaft.

For these reasons, it is known to equip the spindle with special gaskets, which are particularly strong in order to avoid the risk of hazardous leakage.

Such gaskets, although strong and reinforced, are still subjected to wear action by rubbing due to the continuous rotation of the spindle; furthermore, the gas itself tends to chemically corrode the gaskets over time.

In light of the above, the gaskets of known solutions do not always ensure an optimum sealing for the gases which touch the throttle body or actuator over time.

SUMMARY OF THE INVENTION

The need is therefore felt to solve the drawbacks and limitations mentioned above with reference to the prior art.

The need is therefore felt to provide a throttle body which ensures, over time, a safe and reliable sealing to possible leakage of gas inside the chamber which houses the actuation kinematics of the throttle valve shaft.

Such a need is met by a throttle body or actuator for an engine, comprising a main body which defines at least one supply duct having a through lumen for a gas mixture. A choke valve is placed inside the supply duct so as to modify the through lumen. The choke valve is provided with an occluding body connected to a control shaft, at least partially housed in a seat in the main body. The control shaft, inside the seat on the side of the occluding body, is provided with a first gasket to prevent the penetration of dirt and gas coming from the supply duct. Downstream of the first gasket, on the side of the control shaft, at least one vent is provided suitable to allow the expulsion, outside the seat, of any gas which has leaked through the first gasket. The vent is provided with a non-return device of the gases which pass through the vent, so as to prevent the backflow of said gases from the vent towards the seat.

BRIEF DESCRIPTION OF THE DRAWINGS

Other advantages of the invention will be readily appreciated as the same becomes better understood by reference to the following detailed description when considered in connection with the accompanying drawings, wherein.

Elements or parts in common to the embodiments described below will be indicated using the same reference numerals.

DETAILED DESCRIPTION OF THE INVENTION

Figure 1:
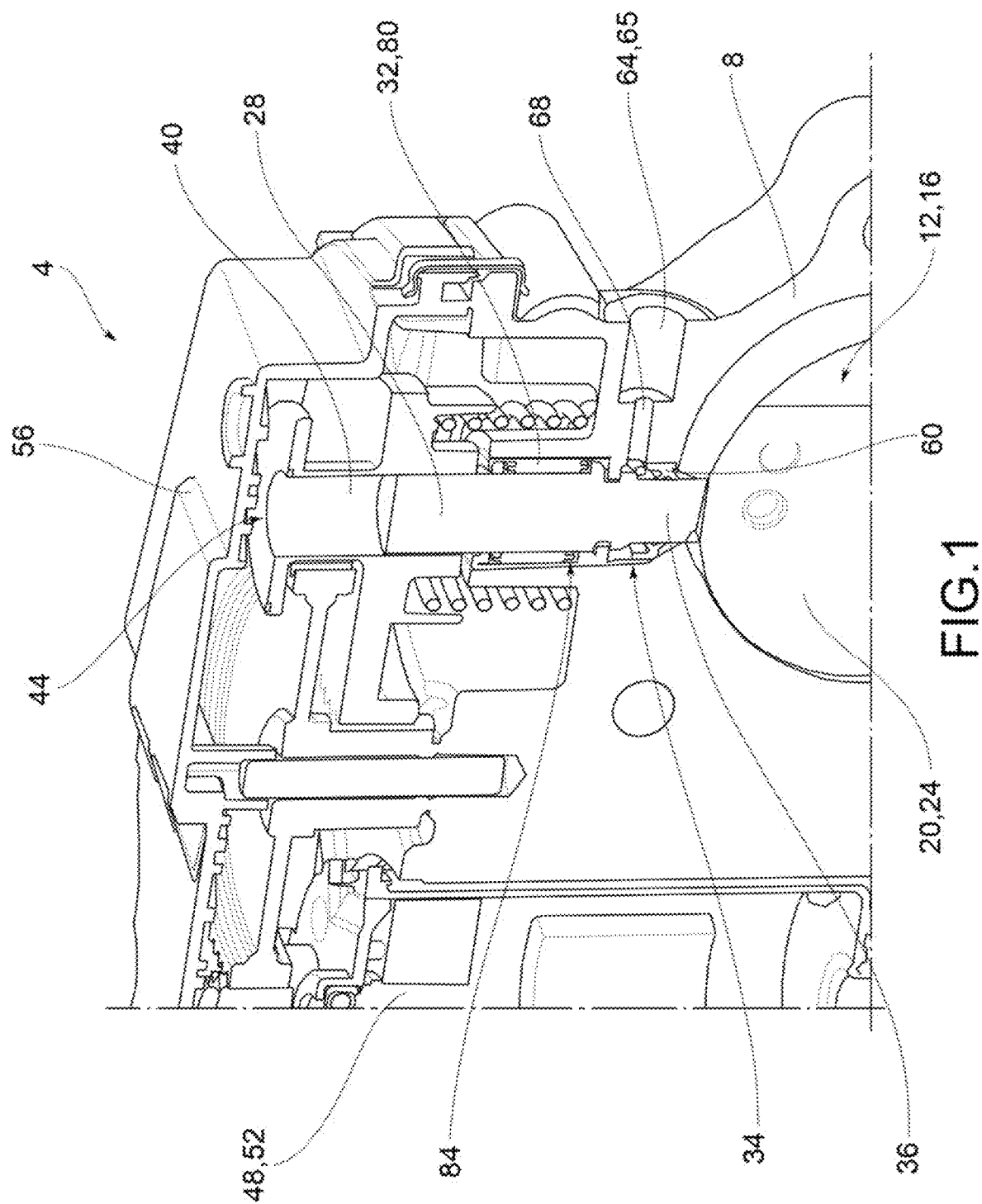
FIG. 1 shows a perspective section view of a throttle body, according to an embodiment of the present invention.
Figure 2:
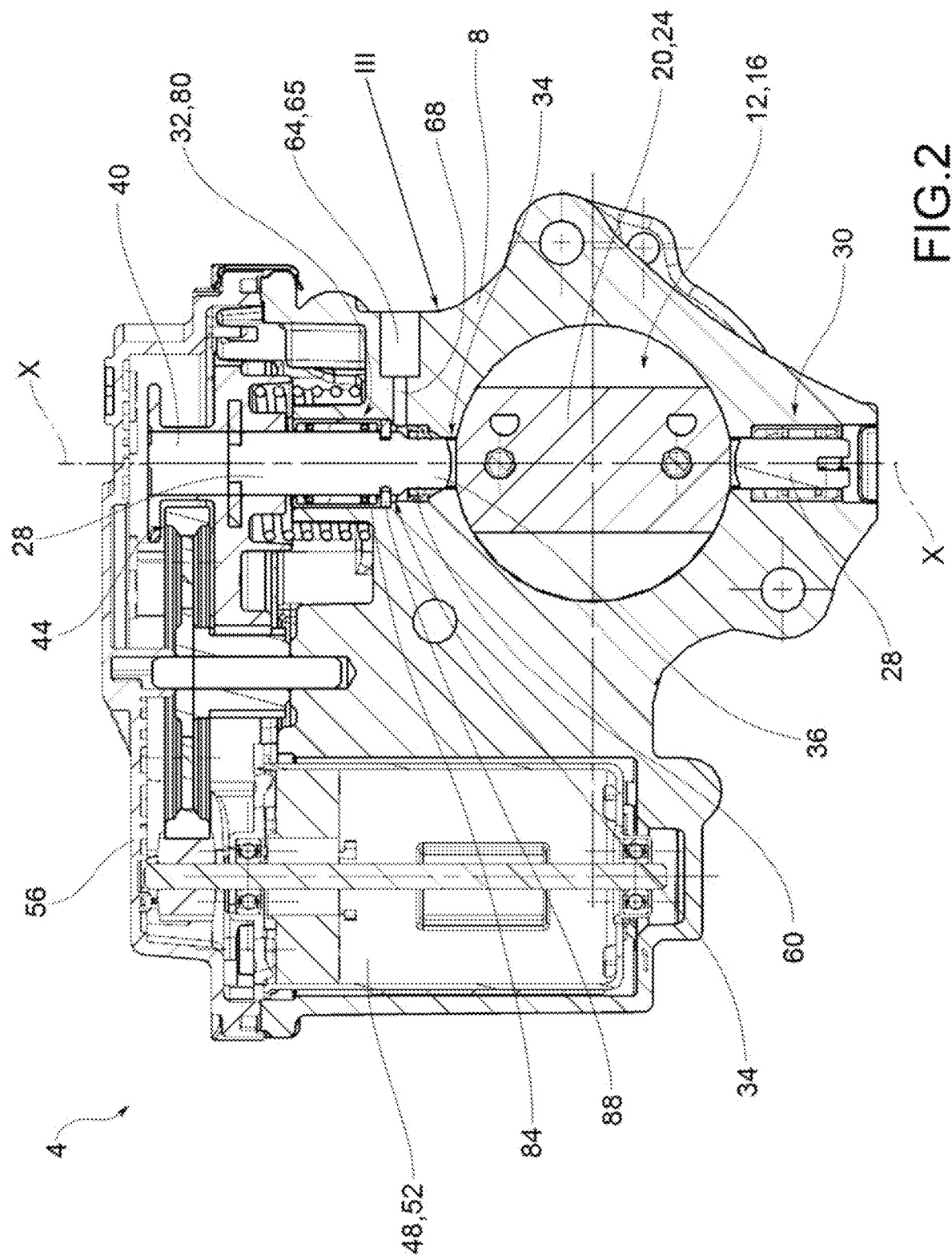
FIG. 2 shows a front view of the section in FIG. 1.
Figure 3:
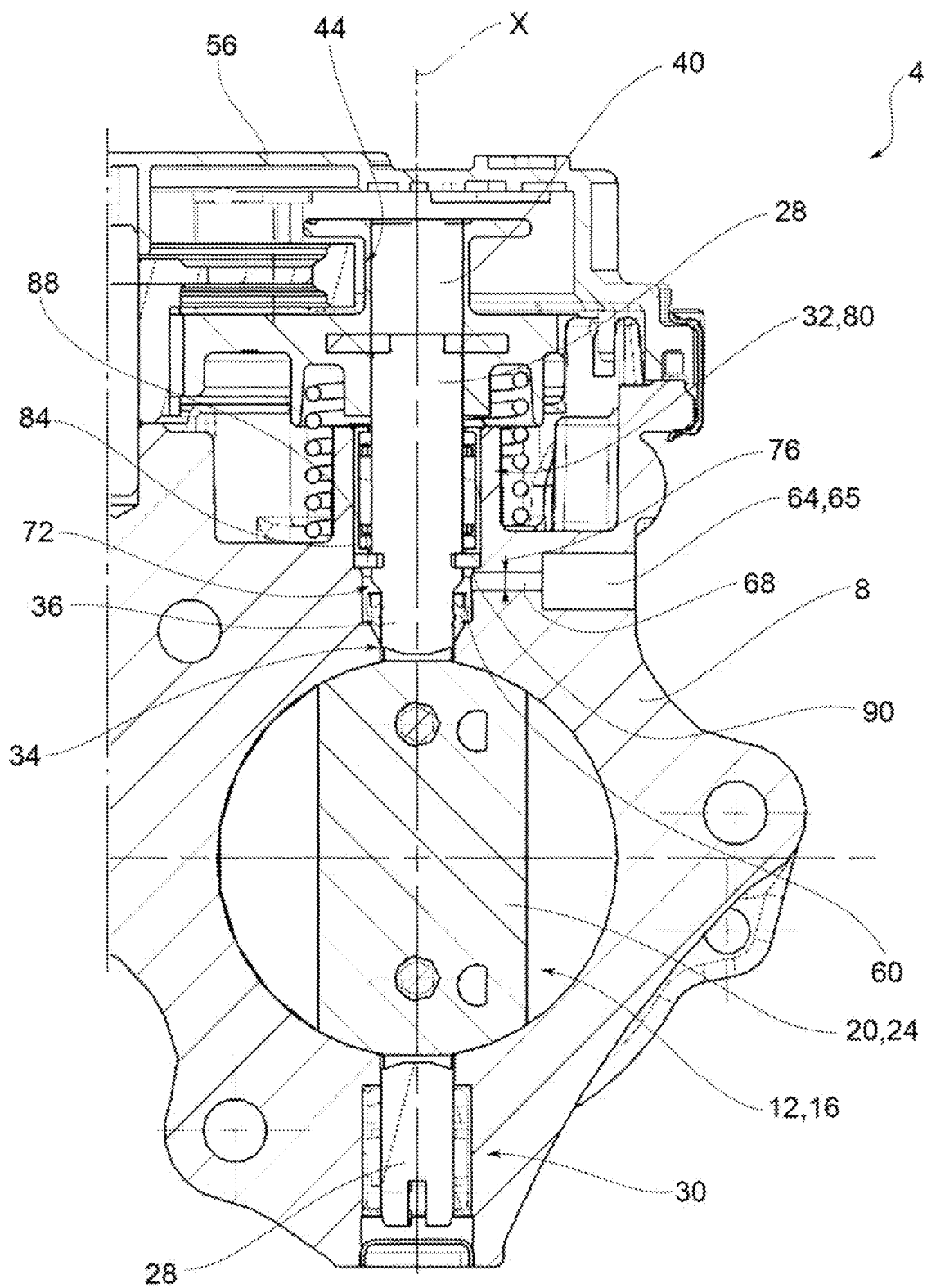
FIG. 3 shows the enlarged detail III in FIG. 2.
Figure 4:
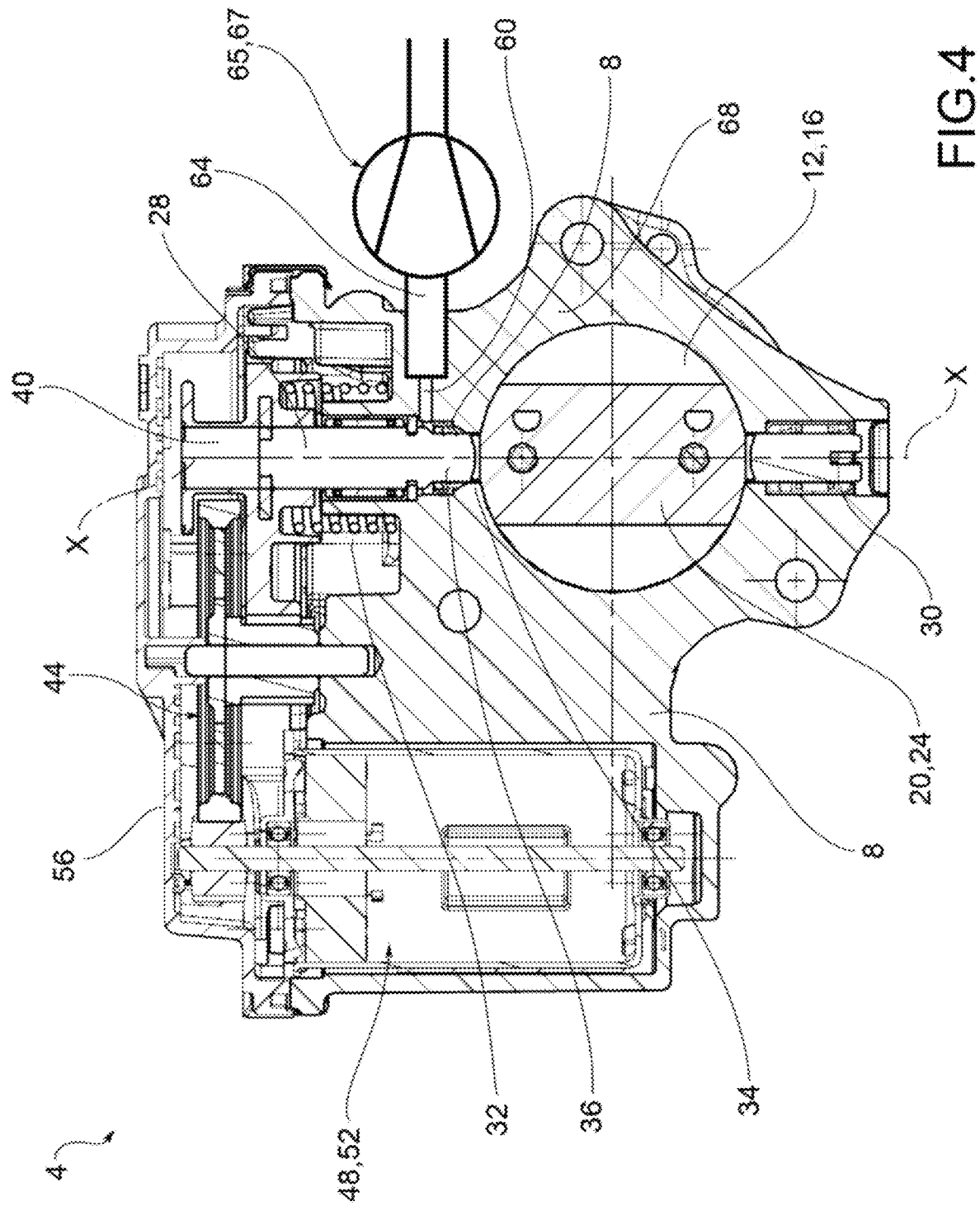
FIG. 4 shows a section view of a throttle body according to a further embodiment of the present invention.

With reference to the aforementioned figures, reference numeral 4 globally indicates a throttle body or actuator for an engine according to the present invention.

As mentioned, it may be a throttle body adapted to supply a mixture of fuel and/or the combustion supporting air, such as gasoline, diesel, LPG, methane, hydrogen, adapted to be mounted on internal combustion engines, fuel cells and the like; it can also be an actuator, such as an exhaust gas recirculation valve (EGR) and so forth.

For the purposes of the present invention, the aforesaid applications must be considered in an explicative and non-exhaustive manner.

The throttle body or actuator 4 comprises a main body 8 which delimits at least one supply duct 12 having a through lumen 16 for a gas mixture.

Preferably, but not necessarily, the main body 8 is made of aluminum or an alloy containing aluminum.

A choke valve 20 is arranged inside said supply duct 12 in order to modify said through lumen 16.

In particular, the choke valve 20 is provided with an occluding body 24 connected to a control shaft 28, at least partially housed in a seat 34 in the main body 8.

For example, the occluding body 24 may be defined by a butterfly or plate substantially counter-shaped with respect to said through lumen 16 of the supply duct 12, as occurs for example in traditional throttle valves. The control spindle 28 is rotational about a rotation axis X-X so as to appropriately vary the through lumen 16 by modifying the angular orientation of the occluding body 24 with respect to the rotation axis X-X itself, in a known manner.

The rotation axis X-X is typically, but not exclusively oriented perpendicularly with respect to 1 flow direction of the gas or mixture of gases which pass through the supply duct 12.

The control spindle 28 according to an embodiment perpendicularly crosses the supply duct 12, on opposite sides with respect to the through lumen 16 and the occluding body 24.

Thereby, the occluding body 24 is cantilevered on supports 30, 32 arranged on opposite sides with respect to the supply duct 12.

Such supports 30, 32 also act appropriately as support bearings.

According to a possible embodiment, the control spindle 28, one the side of one of said supports 30, 32, comprises a first connection portion 36 to the occluding body 24 and a second connection portion 40 to an actuation mechanism 44.

Said actuation mechanism 44 is, in turn, connected to a motor 48 that appropriately rotates the drive shaft 28 and therefore the occluding body 24 about the rotation axis X-X.

The actuation mechanism 44 can be of various types, including, for example, toothed wheels, gears, pulleys and similar motion transmission devices. Said actuation mechanism 44 can be housed in a specific housing 52 formed inside the main body 8; the actuation mechanism 44 and the motor 48 can also be accommodated inside a casing 56 applied to partially close the main body 8.

The motor 48 may include an electric motor which may have a motor axis either parallel or perpendicular to the rotation axis X-X.

The control shaft 28, inside the seat 34 and on the side of the occluding body 24, is provided with a first gasket 60 adapted to prevent the penetration of dirt and gas from the supply duct 12.

Typically, the first gasket 60 is an O-ring fitted about the first connection portion 36 of the occluding body 24.

Advantageously, downstream of the first gasket 60, on the side of the control shaft 28, at least one vent 64 is provided, adapted to allow the expulsion, outside the seat 34, of any gas which has leaked through the first gasket 60.

Said vent 64 may be of various shapes and sizes and has the purpose, as seen, to allow an easy and rapid expulsion of the possibly leaked gas.

The vent 64 may, for example, be inserted by snapping, screwing, gluing, welding inside a hole 68 formed at least partially inside the main body 8 to intercept the seat 34 and the possibly leaked gases therewith.

More in detail, advantageously the vent 64 is provided with a non-return device 65 of the gases which pass through the vent 64, so as to prevent the backflow of said gases from the vent 64 towards the seat 34.

According to a possible embodiment, said non-return device 65 comprises a non-return valve 66 so as to prevent the backflow of gas from the vent 64 towards the seat 34.

Figure 5:
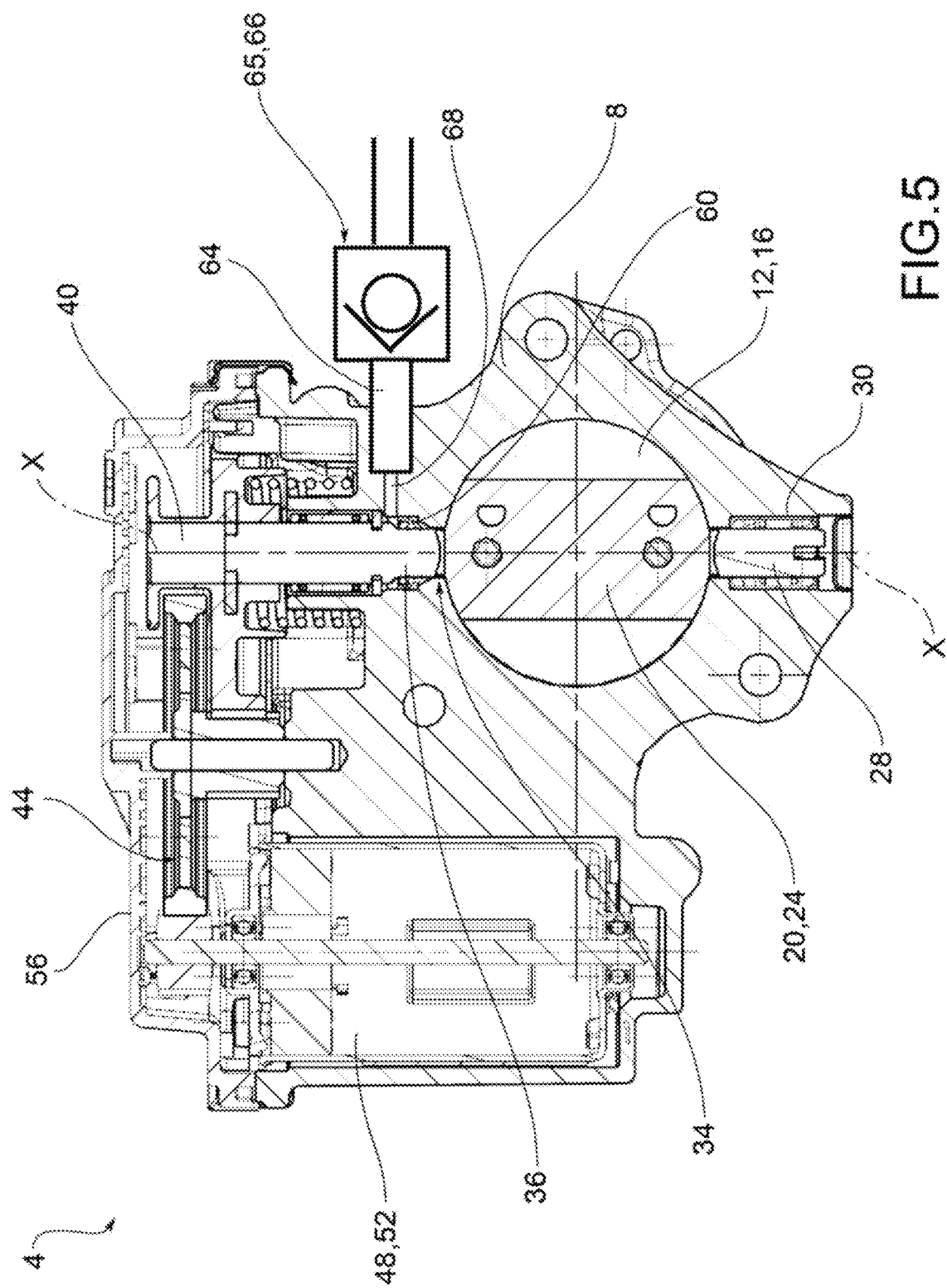
FIG. 5 shows a section view of a throttle body according to a further embodiment of the present invention.
Figure 6:
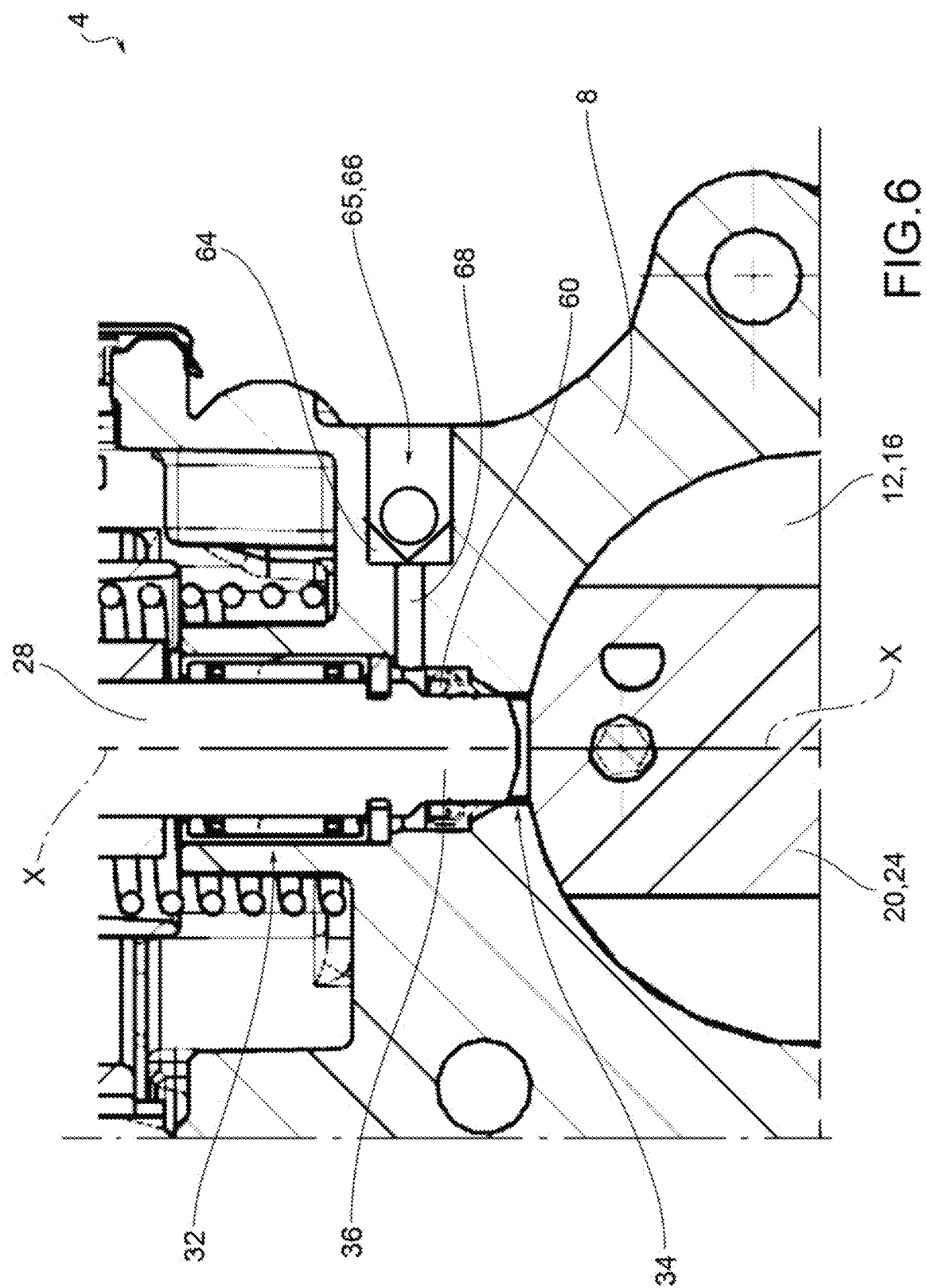
FIG. 6 shows a section view of a throttle body according to a further embodiment of the present invention.

Said non-return valve 66 can be integrated inside the vent 64 (FIG. 6), or said non-return valve 66 can be external and downstream with respect to the vent 64 (FIG. 5).

According to a further possible embodiment, the non-return device 65 of gases comprises or is connected fluidly to a suction system 67 so as to prevent the backflow of gas from the vent 64 towards the seat 34. For example said suction system 67 may comprise a pump or a similar device designed to create a vacuum which sucks the gases coming from the vent 64 preventing their reflux towards the seat 34.

Figure 7:
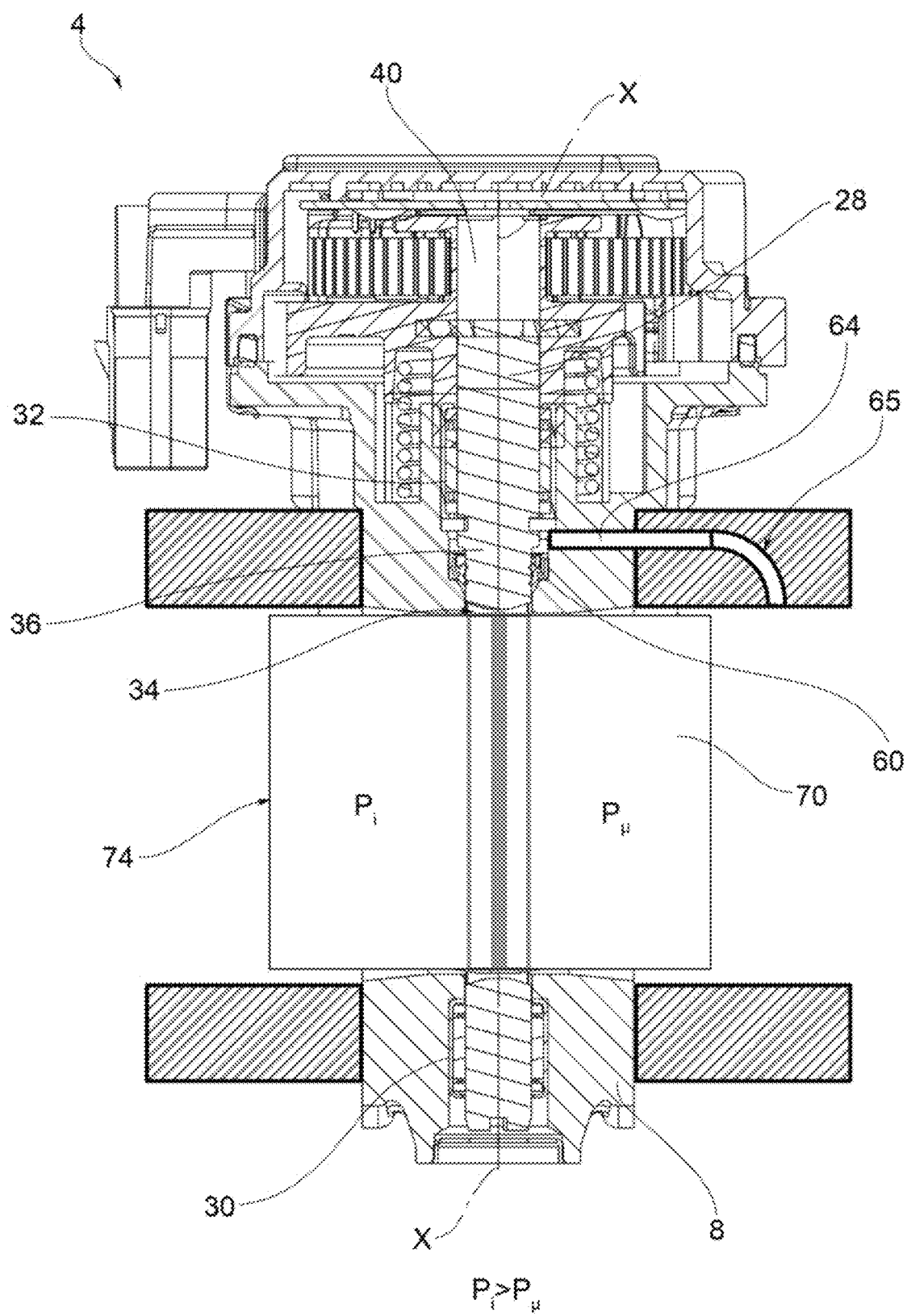
FIG. 7 shows a section view of a throttle body according to a further embodiment of the present invention.

According to a possible embodiment (FIG. 7), the non-return device 65 of gases comprises or is fluidly connected to an outlet portion 70 of the throttle body 4 which is at an outlet pressure Pu lower than an inlet portion 71 of the throttle body 4 which is at an inlet pressure Pi higher than said outlet pressure Pu, so as to prevent the backflow of said gases towards the vent 64.

According to a possible embodiment, the vent 64 is fluidly connected to the supply duct 12 so as to o re-enter in the supply duct 12 itself any gases drawn into the seat 34.

According to a possible embodiment, the control shaft 28 is provided with a groove or chamfer 72 and the vent 64 is arranged to so as lead into the seat 34 at said groove or chamfer 72.

Such a groove or chamfer 72 has precisely the purpose of achieving a local expansion of the gases possibly drawn inside the seat 34, so as to avert the risk of the leakage continuing towards the actuation mechanism 44, and of facilitating the expulsion of such a gas through the vent 64 provided, for this purpose, precisely near the groove or chamfer 72.

The vent 64 may include a through area 76 greater than a coupling clearance of the control shaft 28 relative to the seat 34 and/or relative support bearings 80 of the control shaft 28.

By virtue of this sizing, the expulsion of gas is further facilitated through the vent 64, whereby preventing them from being able to penetrate into the support bearing 80 and into the actuation mechanism 44.

According to a possible embodiment, the first connection section 36 of the actuation shaft 28 has a diameter smaller than the diameter of the second connecting portion 40 of said spindle. By virtue of this arrangement, the theoretical gas leakage area from the supply duct 12 towards the seat 34 is reduced to a minimum because it is proportional to the circumference of the first connection section 36 of the drive shaft 28.

According to a possible embodiment, the control shaft 28 comprises at least one support bearing 80 arranged, inside the seat 34, downstream of the vent 64, and equipped with a second gasket 84, which is adapted to prevent the penetration of dirt and gas from the supply duct 12. Indeed, the second gasket 84 has the dual purpose of preventing the gas which may have leaked into the seat 34 from continuing inside the support bearing 80 and the actuation mechanism 44, and of providing adequate protection against the introduction of dust and dirt, as well as adequate containment of the lubricating grease within the support bearing 80.

In one embodiment, the second gasket 84 is arranged downstream of the groove or chamfer 72 of the control shaft 28, so that the groove or chamfer 72 is between the first and second gaskets 60, 84.

Thereby, any leaked gas is confined between the first and the second gasket 60, 84 and therefore may be easily evacuated through the vent 64 which opens, preferably, straddling said gaskets 60, 84.

According to a possible embodiment, the control shaft 28 comprises at least one plate 88 to axially constrain the control shaft 28 to a shoulder 90 inside the seat 34.

In one embodiment, the plate 88 is arranged downstream of the vent 64. Thereby, the plate 88 also contributes to creating a further barrier to the outflow of leakage gas, and thus to facilitating the escape of said gas through the vent 64.

In another embodiment, the plate 88 is arranged upstream of a second gasket 84 of the control shaft 28, arranged inside the seat 34, downstream of the vent 64, to protect a support bearing 80 of the control shaft 28.

As can be appreciated from the description above, the throttle body or actuator according to the invention makes it possible to overcome the drawbacks presented in the prior art.

Indeed, by virtue of the presence of the vent, it is possible to create a preferential exit path of gases possibly drawn from the first gasket facing the throttle and the supply duct.

Therefore, any leaked gas may not pass beyond the second gasket, forming barrier for the bearings of the shaft, and will find an easy outlet through said vent.

So, also as a result of wear of the internal gaskets, possible gas flows will be easily and naturally evacuated through the vent before they can reach and/or overcome the kinematic system for actuating the throttle.

Advantageously, the vent is provided with a non-return device for the gases which pass through the outlet vent, so as to prevent the backflow of said gases from the vent towards the seat. The presence of said non-return device of the gas, in its various active (suction system) and passive (non-return valves and gas recoveries) guarantees that there can be no backflow of gas inside the housing and the chamber of the throttle body housing the kinematics and the spindle bearings.

In turn, the vent may be fluidly connected to the introduction into the feeding duct so as to recover the leaked fuel/combustion supporting air. In such a case, it will be useful to provide the vent with a check valve so as to prevent any backflow of gas toward the throttle body chamber which houses the mechanism and the bearings of the shaft.

The vent is advantageously arranged over the first gasket so as not to be subject to the formation of ice which would close it whereby compromising its functionality.

The first gasket therefore acts as a dust and also an ice barrier, in addition to macroscopic barrier for the gas which passes through the supply duct.

Substantially, unlike the known solutions which provide increasing the number and strengthening the type of gaskets in order to avoid the risk of leakage, the present invention suggests not to prevent the absolute leakage of gas, but rather to channel it through the vent so that the gas does not stagnate inside the throttle body seat. All the measures provided in the present invention are therefore aimed at creating a preferential escape path of leaked gas so that it can easily be expelled from the vent without creating any kind of stagnation which, over time, could reach the sensitive and dangerous parts of the throttle body.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A throttle body or actuator for an engine, comprising:
a main body which defines at least one supply duct having a through lumen for a gas mixture,
a choke valve placed inside said supply duct that modifies said through lumen,
the choke valve being provided with an occluding body connected to a control shaft, at least partially housed in a seat in the main body,
wherein the control shaft, inside the seat on the side of the occluding body, is provided with a first gasket to prevent the penetration of dirt and gas coming from the supply duct,
wherein downstream of the first gasket, on the side of the control shaft, at least one vent is provided suitable to allow the expulsion, outside the seat, of any gas which has leaked through the first gasket, and
wherein the vent is provided with a non-return device of the gases which pass through the vent, so as to prevent the backflow of said gases from the vent towards the seat.

2. The throttle body or actuator as set forth in claim 1, wherein said non-return device comprises a non-return valve.

3. The throttle body or actuator as set forth in claim 2, wherein said non-return valve is integrated inside the vent.

4. The throttle body or actuator as set forth in claim 2, wherein said non-return valve is external and downstream with respect to the vent.

5. The throttle body or actuator as set forth in claim 1, wherein the non-return device of gases comprises or is connected fluidly to a suction system so as to prevent the backflow of gas from the vent towards the seat.

6. The throttle body or actuator as set forth in claim 1, wherein the non-return device of gases comprises or is fluidly connected to an outlet portion of the throttle body which is at an outlet pressure (Pu) lower than an inlet portion of the throttle body which is at an inlet pressure (Pi) higher than said outlet pressure (Pu), so as to prevent the backflow of said gases towards the vent.

7. The throttle body or actuator as set forth in claim 1, wherein the vent is fluidly connected to the supply duct such that any gases drawn into the seat may re-enter the supply duct.

8. The throttle body or actuator as set forth in claim 1, wherein the control shaft is provided with a groove or chamfer and the vent is arranged to so as lead into the seat at said groove or chamfer.

9. The throttle body or actuator as set forth in claim 1, wherein said vent comprises a through area greater than a coupling clearance of the control shaft relative to the seat and/or relative support bearings of the control shaft.

10. The throttle body or actuator as set forth in claim 1, wherein the control shaft comprises at least one support bearing arranged, inside the seat, downstream of the vent, and equipped with a second gasket), which prevents the penetration of dirt and gas from the supply duct.

11. The throttle body or actuator as set forth in claim 10, wherein said second gasket is arranged downstream of a groove or chamfer of the control shaft, so that the groove or chamfer is between the first and second gaskets.

12. Throttle body or actuator as set forth in claim 1, wherein the control shaft comprises a first connection section to the occluding body and a second connection section to a drive mechanism in turn connected to a motor, the first connection section having a smaller diameter than the diameter of the second connection section.

13. The throttle body or actuator as set forth in claim 1, wherein the control shaft comprises at least one plate to axially constrain the control shaft to a shoulder inside the seat).

14. The throttle body or actuator as set forth in claim 13, wherein said plate is arranged downstream of the vent.

15. The throttle body or actuator as set forth in claim 13, wherein said plate is arranged upstream of a second gasket of the control shaft, arranged inside the seat, downstream of the vent, to protect a support bearing of the control shaft.

* * * * *